Figure 1:
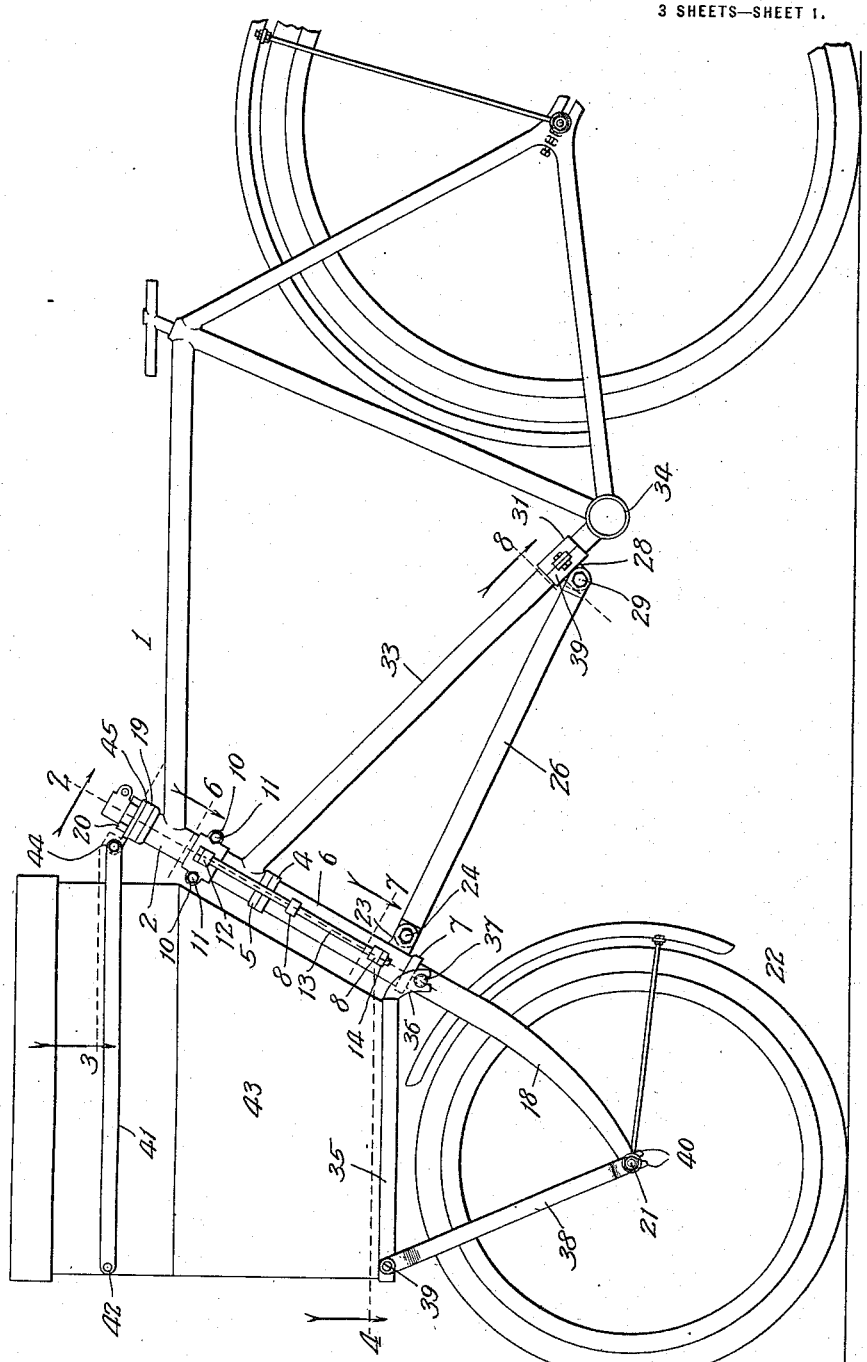

A. D. MEISELBACH.
BICYCLE ATTACHMENT.
APPLICATION FILED NOV. 13, 1914.

1,155,324.

Patented Sept. 28, 1915.
3 SHEETS—SHEET 1.

Witnesses:

Inventor:
August D. Meiselbach.
By David H. Fletcher,
Atty.

COLUMBIA PLANOGRAPH CO., WASHINGTON, D. C.

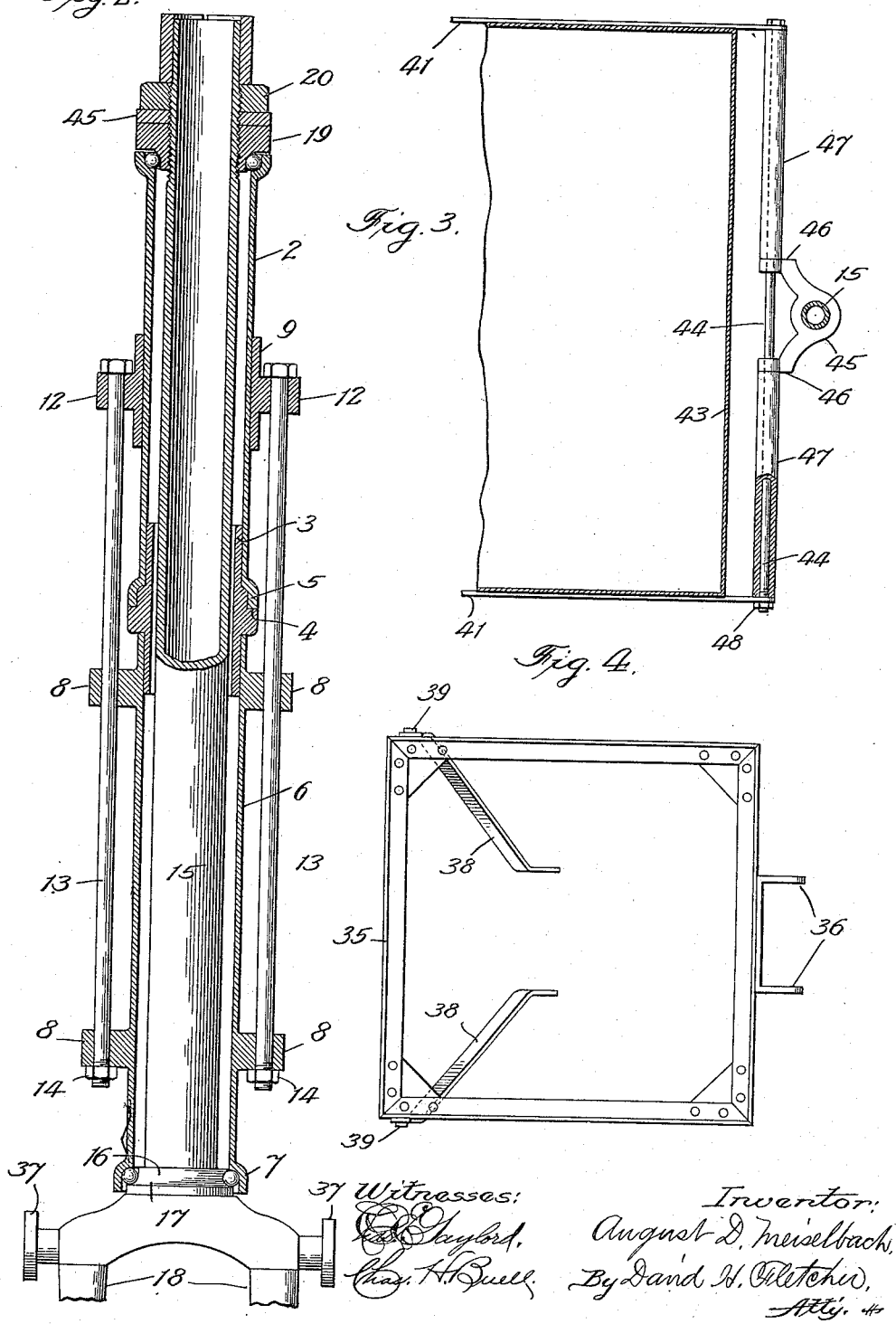

A. D. MEISELBACH.
BICYCLE ATTACHMENT.
APPLICATION FILED NOV. 13, 1914.
1,155,324.
Patented Sept. 28, 1915.
3 SHEETS—SHEET 3.
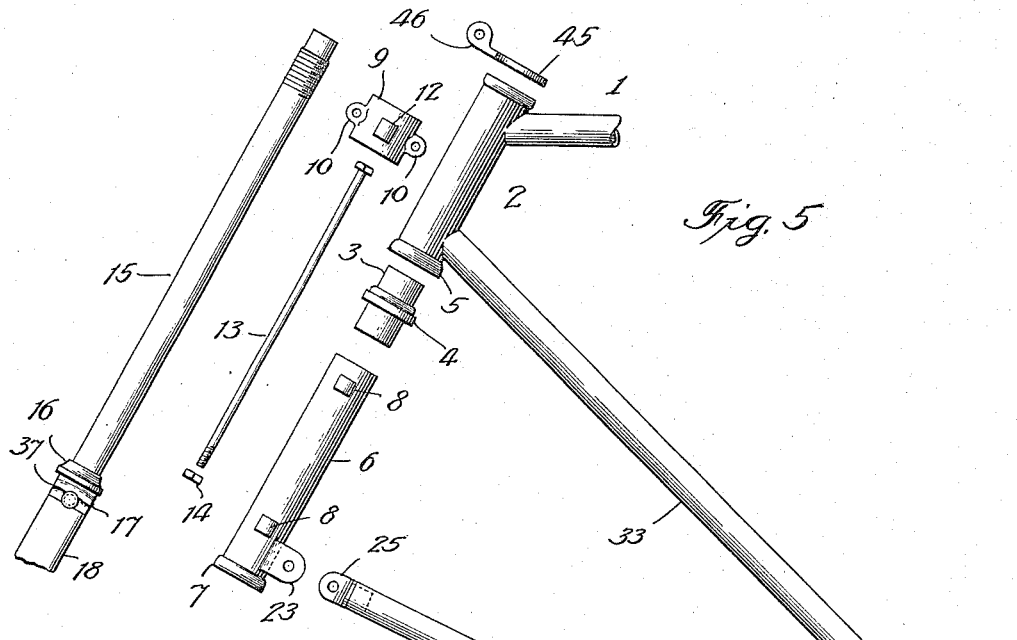
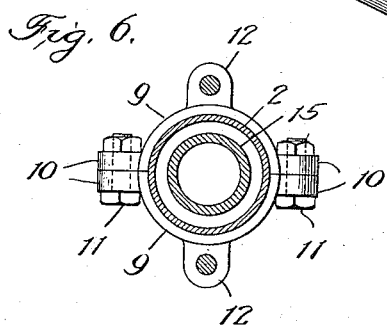
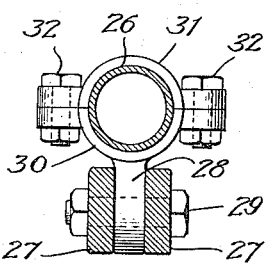
Witnesses:
Inventor:
August D. Meiselbach,
By David H. Fletcher,
Atty.

UNITED STATES PATENT OFFICE.

AUGUST D. MEISELBACH, OF CHICAGO, ILLINOIS, ASSIGNOR TO HANDY BICYCLE COMPANY, OF CHICAGO, ILLINOIS, A CORPORATION OF ILLINOIS.

BICYCLE ATTACHMENT.

1,155,324.  Specification of Letters Patent.  Patented Sept. 28, 1915.

Application filed November 13, 1914. Serial No. 871,949.

*To all whom it may concern:*

Be it known that I, AUGUST D. MEISELBACH, a citizen of the United States, residing at Chicago, in the county of Cook and State of Illinois, have invented certain new and useful Improvements in Bicycle Attachments, of which the following is a description, reference being had to the accompanying drawings, forming a part of this specification, in which corresponding numerals of reference in the different figures indicate like parts.

The object of my invention is to provide a simple, cheap and effective attachment for bicycles, tricycles and the like, which shall be so constructed as to enable a relatively small front wheel to be attached to and utilized with any standard bicycle frame, so as to enable a parcel carrier to be secured in front of the frame and above the wheel in such a way as to lower the center of gravity of the load; and this without changing or modifying the standard frame or preventing its use with a wheel of normal size when the carrying receptacle is not needed.

To these ends, my invention consists in the combination of elements hereinafter more particularly described and definitely pointed out in the claims.

Referring to the drawings—Figure 1 is a side elevation of a bicycle embodying the features of my invention. Fig. 2 is a central sectional view taken upon the line 2, Fig. 1, viewed in the direction of the arrow there shown. Fig. 3 is a sectional view in plan taken upon the line 3, Fig. 1. Fig. 4 is a plan view of the supporting frame for receiving and sustaining the bottom of the carrying receptacle, said view being taken upon the line 4, Fig. 1. Fig. 5 is a view of a portion of a regular bicycle frame including the several separated parts adapted to form an extension thereto when assembled. Fig. 6 is an enlarged section taken upon the line 6, Fig. 1. Fig. 7 is a like view taken upon the line 7, Fig. 1, and Fig. 8 is a like view taken upon the line 8, Fig. 1, viewed in the direction of the arrow there shown.

Referring to the drawings, 1 indicates generally an ordinary standard bicycle frame, having the usual short steering-head 2. Arranged to be removably inserted and to fit accurately within the lower end of the steering-head, is a short tube 3, Figs. 2 and 5, having a shoulder 4, also shown in Fig. 1, adapted to abut against the lower end of a ball-bearing or raceway cup 5, of the steering-head. The lower portion of the tube 3, is adapted to telescope with the upper end of an extension tube 6, the lower end of which is provided with the usual ball-bearing cup 7, corresponding to the part 5, of the standard steering-head. Lugs 8, 8, are formed in alinement with each other upon diametrically opposite sides of the extension tube 6. Counterpart clamping members 9, 9, having perforated lugs 10 are rigidly attached to the steering head 2 by means of bolts 11. Said clamping members are provided with lugs 12, adapted to be arranged in alinement with the lugs 8. Said lugs are bored for the reception of headed retaining rods 13, having nuts 14, upon their lower ends adapted to bear against the lowermost lugs 8, and when tightened, to hold the extension tube 6, rigidly in place. A tubular steering-shaft 15, having the usual ball-bearing ring 16, fork-head 17, and fork members 18, is made of the requisite length to extend through the extension tube 6, and steering-head 2, and is threaded at the upper end for the reception of the usual ball-bearing ring or cone 19, and lock-nut 20. The fork members 18, are attached in the usual way to the axle 21, of a relatively small front wheel 22, and are of such a length as to enable the top bar of the main frame to be substantially horizontal. Formed upon the lower end of the tube 6, at the rear thereof, are perforated lugs 23, better shown in Figs. 5 and 7, to which is secured by means of a bolt 24, a lug 25, rigidly attached to the forward end of a brace-bar 26, provided at its rear end with lugs 27, Figs. 5 and 8, arranged to receive between them a depending lug 28, and to be secured thereto by means of a bolt 29. Said lug is formed upon one of two counterpart clamping members 30, and 31, having lugs thereon which are connected by means of bolts 32, said clamping members being secured to the lower brace member 33, of the main frame just forward of the hanger 34 as shown in Fig. 1.

The following described means is provided for supporting and securing a carrying receptacle: A light frame 35, preferably rectangular in shape and formed from angle-iron, is provided with rearwardly extended depending hooks 36, 36, Figs. 1 and 4, adapted to engage headed studs 37, 37, Figs. 1, 2, 5 and 7, attached to the forkhead 17. Braces 38, 38, are pivotally attached at 39 to the forward end of the frame, said braces being notched at their lower ends as shown at 40, Fig. 1, to engage the ends of the axle 21, to which they may be secured by means of the usual nuts upon the ends of said axle. Parallel bars 41, 41, Figs. 1 and 3, have their forward ends attached at 42, to a carrying receptacle 43, while the rear ends are secured to a transverse rod 44, in the rear of said receptacle. A thin plate or clip 45, Figs. 1, 2, 3 and 5, is interposed between the bearing cone 19 and the lock-nut 20 by means of which it is held rigidly in place, and serves in lieu of the usual lock washer. Said clip is provided with arms 46, the ends of which are bored to receive the rod 44. Tubes 47, 47, Fig. 3, are mounted upon the rod 44 with the arms of the clip interposed between their adjacent ends. The tightening of a nut 48, upon the end of the rod, serves to secure the parts in place while enabling them to be readily detached.

I am aware that carrying receptacles for bicycles are old; but I am not aware that any means has heretofore been devised for so adjusting and attaching a receptacle to a standard bicycle frame so as to enable the center of gravity of the load to be lowered to a practical height. It is apparent that the extension feature 6, of the steering-head coacts with the supporting members to produce an improved and much desired result. Not only does the construction set forth enable the center of gravity of the receptacle to be so lowered, but by connecting it with the steering forks and shaft, it is always maintained directly in the plane of the wheel.

My improvement may be readily applied to varying sizes and styles of frames including those of motorcycles and tricycles, and may be readily detached therefrom, thereby permitting the standard front wheel to be restored when not used for carrying parcels.

Having thus described my invention I claim:

1. An attachment for bicycles for the purpose specified, comprising, in combination, a steering-head extension arranged to extend downwardly from and in alinement with the standard head, means for rigidly attaching the same to said head, rearwardly extended bracing means for connecting the lower end of said head extension to the main frame, a steering shaft arranged to extend through said standard and extension steering heads and a steering fork and wheel, the latter having a diameter adapted to support the forward end of the main frame at substantially normal height.

2. An attachment for bicycles for the purpose specified, comprising in combination, a steering-head extension arranged to extend downwardly from and in alinement with the standard head, means for rigidly attaching the same to said head, rearwardly extended bracing means for connecting the lower end of said head extension to the main frame, a steering shaft arranged to extend through said standard and extension steering-heads, a steering fork connected with said shaft, a steering wheel of reduced diameter to permit the standard head to remain at substantially normal height, a parcel carrier and means for supporting the same with its center of gravity at the lowest practical level above said wheel, said carrier being secured to and adapted to turn with the steering shaft.

3. An attachment for bicycles, consisting of the combination with a standard steering-head, of a steering-head extension, means for securing the same to the lower end of said steering-head, adjustable bracing means for connecting the lower end of said head extension to the main frame, a steering shaft arranged to extend through said standard and extension steering heads, a steering fork connected with said shaft, a steering-wheel having its diameter reduced in proportion to the relative extension of said steering-head, a parcel carrier and means connected with the steering shaft and fork for sustaining said carrier, immediately above said steering wheel.

4. An attachment for bicycles, consisting of the combination with a standard steering head, of a steering-head extension, means for securing the same to the lower end of said steering-head, bracing means for connecting the lower end of said head extension to the main frame, a steering shaft arranged to extend through said standard and extension steering-heads, a steering fork connected with said shaft, a steering wheel the diameter of which is reduced in proportion to the relative extension of said steering-head, a parcel carrier and means in detachable connection with the steering-shaft and fork for sustaining said carrier with its center of gravity at the lowest practical level above said steering wheel.

5. An attachment for bicycles for the purpose specified, comprising in combination a steering head extension arranged to connect with the lower end of a standard steering-head, means upon said extension for the reception of retaining rods clamping means upon said head and means for connecting said clamping means with said retaining rods.

In testimony whereof, I have signed this specification in the presence of two subscribing witnesses, this tenth day of November, 1914.

AUGUST D. MEISELBACH.

Witnesses:
DAVID H. FLETCHER,
LESLIE W. FRICKE.

Copies of this patent may be obtained for five cents each, by addressing the "Commissioner of Patents, Washington, D. C."